United States Patent
Fish et al.

(10) Patent No.: US 11,388,122 B2
(45) Date of Patent: *Jul. 12, 2022

(54) CONTEXT LINKED MESSAGING SYSTEM

(71) Applicant: Wormhole Labs, Inc., Huntington Beach, CA (US)

(72) Inventors: Robert D. Fish, Tustin, CA (US); Curtis Hutten, Laguna Beach, CA (US)

(73) Assignee: Wormhole Labs, Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,820

(22) Filed: Feb. 3, 2020

(65) Prior Publication Data
US 2020/0314044 A1  Oct. 1, 2020

Related U.S. Application Data

(63) Continuation of application No. 16/368,781, filed on Mar. 28, 2019, now Pat. No. 10,554,596.

(51) Int. Cl.
   *G06F 15/16* (2006.01)
   *H04L 51/046* (2022.01)
   *H04L 67/131* (2022.01)
   *H04L 51/10* (2022.01)

(52) U.S. Cl.
   CPC ............ *H04L 51/046* (2013.01); *H04L 51/10* (2013.01); *H04L 67/38* (2013.01)

(58) Field of Classification Search
   None
   See application file for complete search history.

(56) References Cited

U.S. PATENT DOCUMENTS

| | | |
|---|---|---|
| 7,712,035 B2 | 5/2010 | Giannini |
| 8,814,691 B2 | 8/2014 | Haddick et al. |
| 10,182,210 B1 | 1/2019 | Goetzinger, Jr. |
| 2004/0104935 A1 | 6/2004 | Williamson et al. |
| 2008/0094417 A1* | 4/2008 | Cohen .................. A63F 13/52 345/632 |
| 2008/0155019 A1* | 6/2008 | Wallace ................ A63F 13/71 709/204 |
| 2008/0215994 A1 | 9/2008 | Harrison et al. |
| 2009/0006336 A1 | 1/2009 | Forstall et al. |
| 2010/0049702 A1 | 2/2010 | Martinez et al. |
| 2010/0146085 A1* | 6/2010 | Van Wie ............ H04L 67/1059 709/220 |
| 2010/0185640 A1 | 7/2010 | Dettinger et al. |
| 2010/0205061 A1 | 8/2010 | Karmarkar |
| 2010/0218094 A1 | 8/2010 | Ofek et al. |

(Continued)

*Primary Examiner* — Phuoc H Nguyen
(74) *Attorney, Agent, or Firm* — Fish IP Law, LLP

(57) ABSTRACT

The present application contemplates a method of providing a participant with traversable access to a local environmental context of a target. In preferred embodiments, a context engine accesses multiple views of the local environmental context and stitches together the multiple views to produce a digital, walkabout reality of the local environmental context. Upon a participant/recipient accessing a communication from a sender, the participant is able to use a portal during a viewing session to traverse the digital, walkabout reality associated with a target. It is contemplated that the target is physically located within the local environmental context.

13 Claims, 5 Drawing Sheets

(56) References Cited

U.S. PATENT DOCUMENTS

| | | | |
|---|---|---|---|
| 2011/0022970 A1* | 1/2011 | Sobol | G06Q 10/00 |
| | | | 715/757 |
| 2012/0011002 A1 | 1/2012 | Crowe et al. | |
| 2013/0125026 A1* | 5/2013 | Gaume | G06Q 10/10 |
| | | | 715/757 |
| 2013/0339864 A1* | 12/2013 | Uusitalo | H04W 48/18 |
| | | | 715/736 |
| 2014/0047027 A1* | 2/2014 | Moyers | G06F 9/452 |
| | | | 709/204 |
| 2014/0115059 A1* | 4/2014 | Van Wie | H04W 4/50 |
| | | | 709/204 |
| 2014/0225978 A1* | 8/2014 | Saban | G09F 19/16 |
| | | | 348/14.07 |
| 2016/0134840 A1* | 5/2016 | McCulloch | G06K 9/00208 |
| | | | 348/14.03 |
| 2016/0180602 A1 | 6/2016 | Fuchs | |
| 2017/0161382 A1 | 6/2017 | Ouimet et al. | |
| 2018/0004481 A1* | 1/2018 | Fallon | G06F 3/167 |
| 2018/0181199 A1 | 6/2018 | Harvey et al. | |
| 2018/0260993 A1 | 9/2018 | Thumm | |
| 2019/0051100 A1 | 2/2019 | Russ et al. | |
| 2019/0104235 A1* | 4/2019 | Sarkar | H04N 21/21805 |
| 2019/0108578 A1 | 4/2019 | Spivack et al. | |

\* cited by examiner

CONTEXT LINKED MESSAGING SYSTEM

This application is a continuation of U.S. patent application Ser. No. 16/368,781, filed on Mar. 28, 2019. This application and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is messaging systems.

BACKGROUND

With the increased computing power available in increasingly smaller devices, virtual reality environments and augmented reality environments can be rendered through a variety of mediums. With the increased distribution and engagement with augmented reality and virtual reality environment, messages can provide much more context than messaging mediums provide today. Though one can attach files to emails, send recordings of one's surroundings, and live stream videos to other devices, current technologies fail to take advantage of the additional messaging functionalities that are possible with current augmented and/or virtual reality technologies.

U.S. Pat. No. 8,814,691 to Haddick teaches a system that enables augmented reality based social interactions. In that system, users are required to sign in through a separate website, which then inserts them into an online game that is viewed through a head-mounted eyepiece. Since Haddick requires the use of a head-mounted eyepiece, his technology fails to allow augmented reality messaging to be performed through conventional computing devices.

US Patent Application Publication No. 2010/0049702 to Martinez teaches a messaging system in which context data is derived from relatively static data. For example, Martinez discloses that a sender's social media contacts, personal interests, and selected music can be included in context messages. Martinez fails to contemplate attaching real-world context, such as a live feed, to electronic messages.

U.S. Patent Application Publication No. 2017/0161382 to Oulmet teaches a method of processing image data by receiving both environmental data and associated capture time data. Oulmet contemplates adding metadata to ephemeral messages to provide a recipient with static environmental context of the message at the time of sending. Oulmet fails to take advantage of the increased computing power of current personal computing devices that enable real-world context data to include augmented reality and/or virtual reality context.

Haddick, Martinez, Oulmet, and all other extrinsic materials discussed herein are incorporated by reference to the same extent as if each individual extrinsic material was specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for mixed reality systems infrastructures that allow participants/recipients to access context data that is used to construct a traversable, digital, walkabout reality.

SUMMARY OF THE INVENTION

Among other things, the inventive subject matter provides apparatus, systems, and methods in which emails, texts, and/or other communications are sent with non-static, real world context of the sender. For example, a message sent by a sender in a coffee shop might include images of the patrons and interior of the coffee shop.

As defined herein, context data can include any contextual data associated with a real-world environment, an augmented reality environment, and a virtual environment of a sender.

Various resources, features, aspects and advantages of the inventive subject matter will become more apparent from the following detailed description of preferred embodiments, along with the accompanying drawing figures in which like numerals represent like components.

The present invention advantageously provides enhanced context associated with augmented reality and virtual reality spaces in electronic communications.

DETAILED DESCRIPTION

While the following description is drawn to a computer-based scheduling system, various alternative configurations are also deemed suitable and may employ various computing devices including servers, interfaces, systems, databases, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclose apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed systems and methods provide many advantageous technical effects including improving conventional communications mediums by incorporating context into messages.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
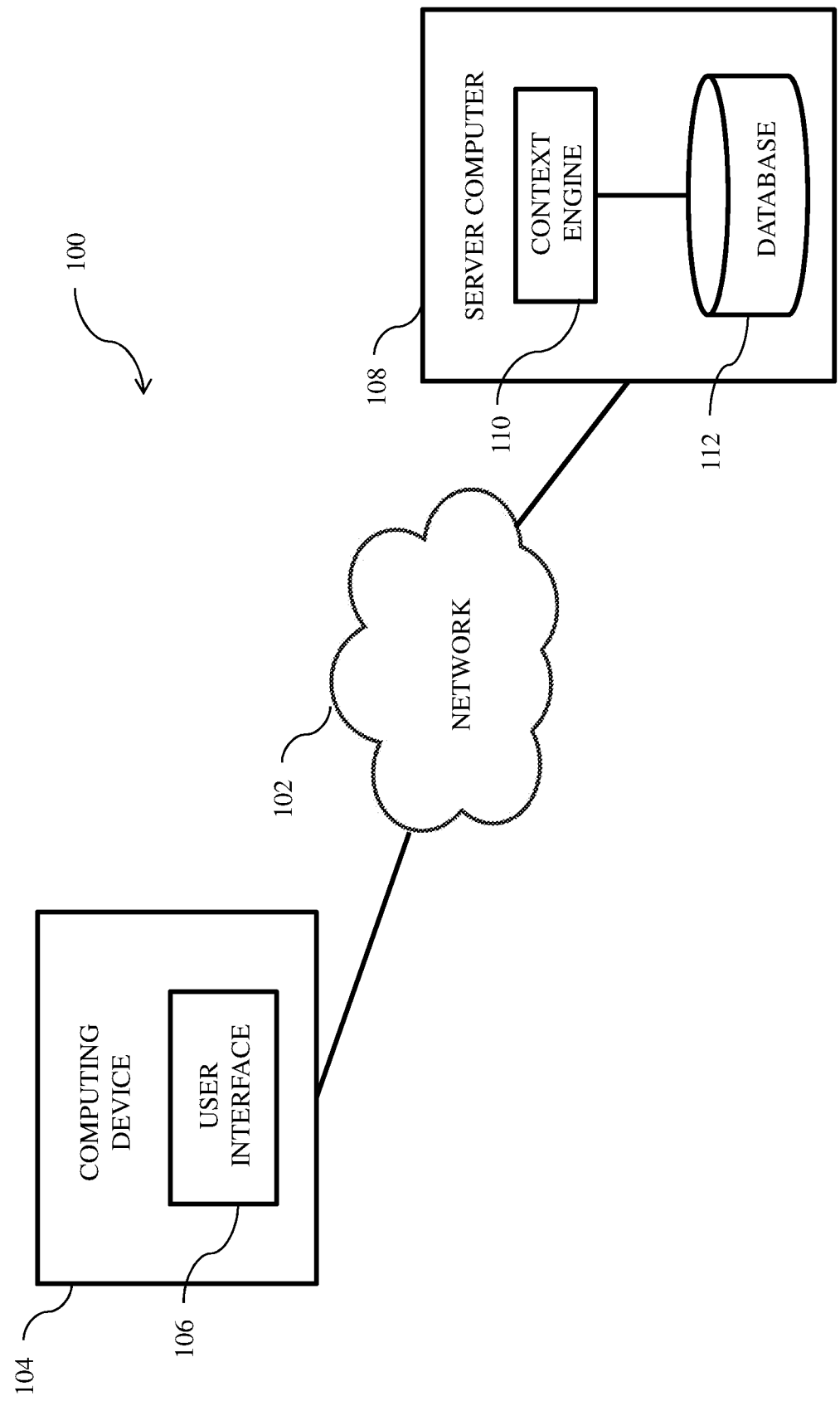
FIG. 1 is a functional block diagram illustrating a distributed data processing environment.

FIG. 1 is a functional block diagram illustrating a distributed data processing environment.

The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 104 and server computer 108, interconnected over network 102. Network 102 can include, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 104, server computer 108, and any other computing devices (not shown) within distributed data processing environment 100.

It is contemplated that computing device 104 can be any programmable electronic computing device capable of communicating with various components and devices within distributed data processing environment 100, via network 102. It is further contemplated that computing device 104 can execute machine readable program instructions and communicate with any devices capable of communication wirelessly and/or through a wired connection. Computing device 104 includes an instance of user interface 106.

User interface 106 provides a user interface to context engine 110. Preferably, user interface 106 comprises a graphical user interface (GUI) or a web user interface (WUI) that can display one or more of text, documents, web browser windows, user option, application interfaces, and operational instructions. It is also contemplated that user interface can include information, such as, for example, graphics, texts, and sounds that a program presents to a user and the control sequences that allow a user to control a program.

In some embodiments, user interface can be mobile application software. Mobile application software, or an "app," is a computer program designed to run on smart phones, tablet computers, and any other mobile devices.

User interface 106 can allow a user to register with and configure context engine 110 (discussed in more detail below) to enable a user to access a mixed reality space. It is contemplated that user interface 106 can allow a user to provide any information to context engine 110.

Server computer 108 can be a standalone computing device, a management server, a web server, a mobile computing device, or any other computing system capable of receiving, sending, and processing data.

It is contemplated that server computer 108 can include a server computing system that utilizes multiple computers as a server system, such as, for example, a cloud computing system.

In other embodiments, server computer 108 can be a computer system utilizing clustered computers and components that act as a single pool of seamless resources when accessed within distributed data processing environment 100.

Database 112 is a repository for data used by context engine 110. In the depicted embodiment, context engine 110 resides on server computer 108. However, database 112 can reside anywhere within a distributed data processing environment provided that context engine 110 has access to database 112.

Data storage can be implemented with any type of data storage device capable of storing data and configuration files that can be accessed and utilized by server computer 108. Data storage devices can include, but are not limited to, database servers, hard disk drives, flash memory, and any combination thereof.

Figure 2:
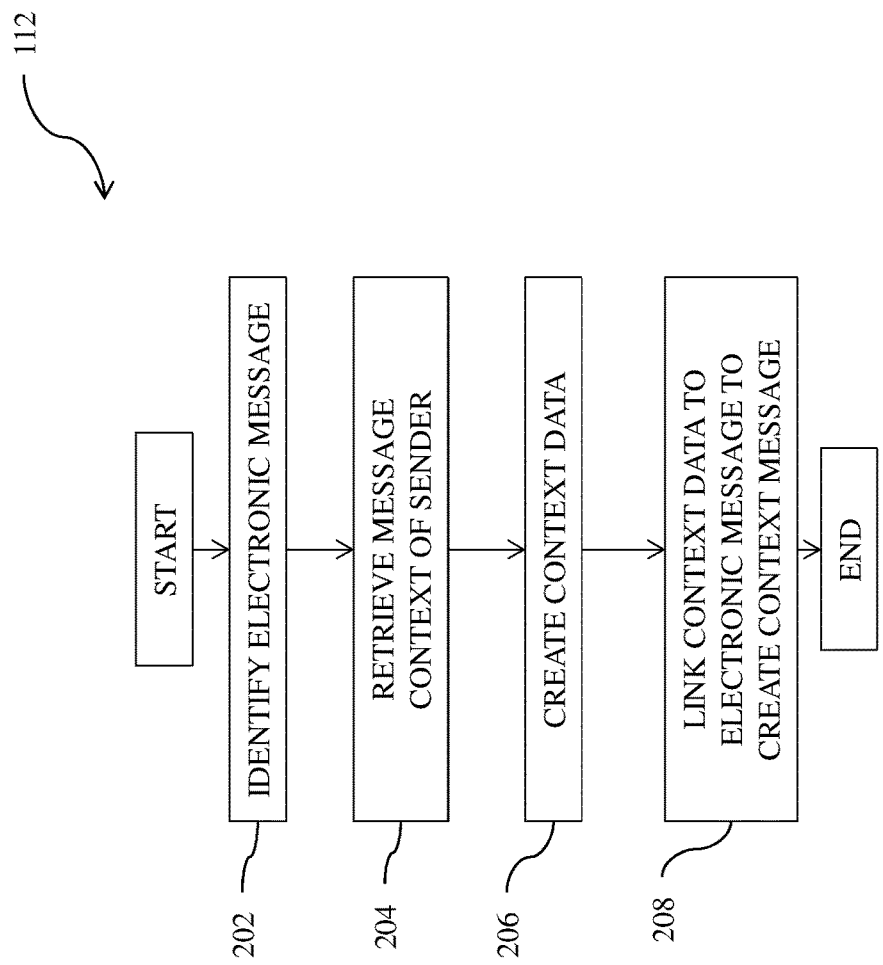
FIG. 2 is a schematic of a method of identifying an electronic message and linking context data to a context message.

FIG. 2 is a schematic of a method of identifying an electronic message and linking context data to a context message.

Context engine 110 identifies an electronic message (step 202).

As used herein, an electronic message can comprise any data transmitted over any transmission medium to a recipient. A recipient can be defined as any party that receives or is intended to receive the electronic message. In some embodiments, the recipient is also the sending party. For example, a sender of the electronic message can send an email to him/herself for archiving.

It is contemplated that context engine 110 can use any one or more methods of identifying electronic messages known in the art.

In one embodiment, context engine 110 executes program instructions that track the delivery and receipt of email using web tracking technologies. Web tracking technologies can include, but are not limited to, cookies, web beacons/pixel tags, ultrasound beacons, and browser fingerprinting.

For example, context engine 110 can use cookies to track user activities to determine when an electronic message is sent and received, as well as identify the electronic message and its contents.

In another example, context engine 110 can identify an electronic message and actions associated with the electronic message based on a pixel tag associated with the electronic message that enables context engine 110 to determine when a recipient, among other action, receives, opens, and manipulates the electronic message.

In yet another example, context engine 110 can identify one or more actions associated with an electronic message using an ultrasonic beacon. More specifically, context engine 110 can cause an ultrasonic sound to be emitted from a sending device which can be tracked using one or more microphones associated with the sending party to determine which electronic message was sent and the time it was sent. Additionally, context engine 110 can cause an ultrasonic sound to be emitted from a receiving device when the electronic message is opened and/or manipulated in some way, which allows context engine 110 to identify which message was sent and which actions were taken by a recipient in response to receiving the electronic message.

In yet another example, context engine 110 can identify an electronic message being sent/received by fingerprinting the web activity of the sender when the user sends an electronic message. Context engine 110 can also identify the recipient and conditions associated with the opening/closing/manipulation of data in the electronic message by fingerprinting the web activity of the recipient.

In another embodiment, context engine 110 runs clients in computing devices 104 of a sender and a recipient, respectively. In doing so, context engine 110 can identify electronic message sent between the two parties and/or messages sent to third parties. It is contemplated that context engine 110 can execute advanced analytical functions associated with messages sent between computing devices 104 using clients.

It is contemplated that context engine 110 can also analyze the contents of an electronic message in identifying the electronic message.

However, it is contemplated that context engine 110 can identify electronic messages, attributes of the electronic message, and actions associated with the electronic messages in any manner known in the art.

Context engine 110 retrieves message context associated with the electronic message (step 204).

Message context can include any identifying information about a user associated with an electronic message. For the purposes of this application, the user can be a target, which comprises any one or more entities associated with the message.

In some embodiments, the message context can be associated with a sender and/or a recipient. For the purposes of this application, the recipient can be a participant. In embodiments where the recipient is a participant, there does not need to necessarily be a transmission of messages between the participant and the sender of the context message. For example, the participant can be a passive viewer watching a streamer passively through a website interface.

The message context is contemplated to give context about a target. A target can include human users, non-human entities, and any combination thereof. For example, a target can be a video game streamer that is the target of the message. In another example, the target can be a website.

Identifying information about a user can include, but is not limited to, information regarding a user's digital footprint, any execution of program instructions caused by user, personal information about the user, environmental information associated with a user, and any entities that a user in connected to.

It is further contemplated that message context can include real world context, virtual world context (e.g., video games, computer simulations, etc.), augmented reality context, and any combination thereof.

In one embodiment, context engine 110 retrieves a user's digital footprint as the message context. For example, context engine 110 can retrieve the browsing history and programs used within the last hour by the user to retrieve the user's shopping history as context to an electronic message containing the keywords "online", "shopping", and "opinion". In a more specific example, context engine 110 can identify that a user is preparing an electronic message about shopping for a new dress and analyze the user's browsing history and purchase history to provide relevant context to a recipient.

In another embodiment, context engine 110 retrieves executed program instructions associated with the user as message context. For example, context engine 110 can identify the last three video games that a user played, achievements unlocked by the user, and amount of time played for each game as message context, in response to a user preparing an electronic message requesting a time to play a game together with an online friend. In another example, context engine 110 can identify the last three text documents saved by a user as message context, in response to a user sending a message to a known work colleague.

In yet another embodiment, context engine 110 retrieves personal information about a user as message context. For example, context engine 110 can identify a user's physical attributes including their height, weight, hair color, and eye color, in response to the user preparing an electronic message sent to a second user on an online dating website. In another example, context engine 110 can identify a user's credentials including personal qualifications, professional qualifications, and work history, in response to the user preparing an electronic message to a potential employer on a hiring website.

In alternative embodiments, a user can select one or more types of information to provide as context to context engine 110. For example, context engine 110 can receive a selection of particular types of data to transfer from a sender to send to a recipient. In another example, context engine 110 can receive a selection of particular types of information authorized by a recipient to receive from a sender. In yet another example, context engine 110 can preselect the types of information that can be attached to a context message. In yet another example, context engine 110 can receive instructions from a third-party program for particular types of data to transfer between recipients and senders.

In augmented reality and virtual reality context, the message context can be presented via user interface 106 as an augmented reality and/or virtual reality-based view of the message sender's environment.

It is further contemplated that the message context can have interactive elements (represented three dimensionally or two dimensionally) that allow a recipient to interact with one or more virtual objects shown in the augmented or virtual reality environment. It is contemplated that the interactive objects can be implemented using any artificial intelligence and/or machine learning technologies known in the art. In one example, context engine 110 can use a time-series classifier to determine what topics a recipient is usually interested depending on the time of day and day of week. Based on this analysis, context engine 110 can present relevant interactive objects to the recipient. For example, context engine 110 can prioritize placing interactive virtual beers outside of bars.

In a related example, context engine 110 can also use a supervised learning classifier to find patterns in common characteristics of real-world objects that the user is interested in. For example, context engine 110 can identify that much of the bars that the recipient has been interested in the past have been more dimly lit, associated with classic rock and roll music, and establishments that are not trending. Based on this analysis, context engine 110 can place interactive objects indicating the presence of a bar that fits the same description, which in turn directs the recipient to dive bars instead of hip hop clubs.

For example, a recipient accessing the augmented reality can select and icon that zooms out of the augmented reality to show more context. The recipient can then select an icon in user interface 106 to filter search results and request all participants in the shared reality within a half mile radius of the recipient. The recipient can then select an avatar within depicted in user interface 106 and send the avatar a private message.

In another example, a recipient accessing the augmented reality can select an icon placed by a business outside of their augmented reality storefront that plays a video about the history of the business.

In yet another example, a recipient can access a particular geolocation depicted on a map and indicated to have large amounts of news worth activity. Based on the indicated hot spot, the recipient can enter the augmented reality space around the newsworthy occurrence to access various views from individuals streaming different perspectives of the scene (e.g., multiple views of a protest).

In instances where a recipient selects a first avatar in the scene to view the augmented reality space through the lens of the selected avatar, it is contemplated that the recipient can further portal into another augmented reality view of a second avatar that is depicted through the perspective of the first avatar. In this way, it is contemplated that a recipient can continue to portal through to different experiences, perspectives, relationships, transactions, discoveries as many times as the user chooses to.

In one example, the selected avatar can accept the message by placing their finger on a smart phone capacitive touch screen over an incoming message icon for more than 2 seconds to accept the message.

In another example, the message can be shown to the selected avatar automatically. In yet another example, the private message can contain a request, such as an offer for sale, a request for a live video feed, and a request to be friends through a social media service.

Additionally, a recipient can traverse the augmented reality and/or virtual reality. For example, a recipient can "walk about" an augmented reality and move through the augmented reality to get a better view of which other avatars are present in the augmented reality space.

For example, context engine 110 can retrieve a three dimensional representation of a bedroom surrounding a sender and incorporate interactive elements. The interactive elements can be other avatars representing other users that are in the bedroom. In a more specific example, the avatars can be clickable, such that clicking the avatar allows the recipient to view the same bedroom through the perspective of a user that did not send the original message.

In another example, context engine 110 can retrieve a live feed from a camera associated with the sender. Cameras can include conventional video cameras, 360° cameras, infrared cameras, and depth-sending cameras. However, cameras are not limited to any particular embodiment, and can comprise any sensor that retrieves visual data. The live feed can also include additional interactive elements, including, for example, a live representation of other users of context engine 110 based on their respective geolocations around the sender.

It is further contemplated that context engine 110 can access multiple views of the local environmental context to stitch together to produce a digital, walkabout reality. Walkabout realities are contemplated to include, but are not limited to, augmented reality environments that are associated with the local environmental context of a target of the context message.

For example, context engine 110 can access a webcam in front of a video game streamer, a 360° camera located in the center of the streamer's bedroom, and two cell phone cameras of friends in the bedroom. Using images captured by the various cameras, context engine 110 can stitch together the photos and create an augmented reality within which the participants can "walkabout".

In preferred embodiments, context engine 110 accesses the multiple cameras to retrieve multiple views of a local environment in a viewing session. A viewing session can include, but is not limited to, times when a participant is accessing the context message and times when a sender allows participants to access the local environmental context of the target. For example, context engine 110 can access multiple cameras in a target's local environment when a participant/recipient accesses the electronic message.

In another example, context engine 11 can access multiple cameras in the target's local environment when a participant/recipient accesses context data associated with the electronic message, as discussed in further detail below.

Context engine 110 creates context data based on the message context (step 206).

It is contemplated that context data can be any combination of data containing program instructions that are executable by a computer processor. For example, context data can include a link to a live video stream, a program instruction to initialize an application, a photo, one or more media records, and application-specific program instruction.

In another embodiment, context data allows a recipient to enter the virtual and/or augmented reality space of the sender. It is contemplated that the context data can be in the form of a portal that allows the recipient to access the local environmental context around a subject/target. For example, a recipient can access a live view from cameras in proximity of the sender and additionally see an augmented reality overlay from the perspective of a selected camera that identifies one or more individuals. In a more specific related example, the recipient can select a camera associated with a first person at a medical conference to view the context of a message. The recipient can then select another camera of a second individual at the medical conference and see the same conference from a different perspective. If the recipient sees a professional acquaintance through the lens of the second individual, the recipient can tap an icon next to the professional acquaintance on user interface 106 to view the conference through the acquaintance's perspective or initiate additional interactive functions (e.g., text messaging, video messaging, etc.). Additionally, it is contemplated that context data can allow the recipient to access an official medical conference stream to access one or more event cameras.

In preferred embodiments, the context data constructs a digital, walkabout reality of the local environment of the target while the target is within the local environment. For example, the context data includes the real-time local environmental context of the target. However, the context data can comprise local environmental context with rapid-time, quick-time, and a slow-time delays. For the purposes of this application, rapid-time is defined as context data that is updated with the local environmental context at least three times over a one-minute period. Quick-time is defined as context data that is updated with the local environmental context at least three times over a ten-minute period. Slow-time is defined as context data that is updated at least three times over a thirty-minute period.

It is contemplated that context engine 110 can capture context data in a continuous manner, an intermittent manner, or any combination thereof. It is further contemplated that context engine 110 captures context data outside the control of the participant. Outside the control of the participant is defined as the updating of the context data occurs autonomously with respect to the participant for at least some portion of a viewing session. It is important to contrast the present inventive concept with services, such as Google Street View™ and similar services, which (1) do not update autonomously with respect to the participant for at least some portion of the viewing session and (2) does not construct a participant-accessible digital, walkabout reality while the target is within the local environmental context. Instead, these technologies capture images and update the context data with much longer delays than discussed in the preceding paragraph.

It is contemplated that the augmented reality overlay can present information in any manner known in the art, including, for example, showing textual data and graphical data (e.g., the name and picture of a shared social media contact between the sender and recipient.).

In some embodiments, context data is attached as a separate executable file in a context message. For example, context data can be an attachment in a dialogue box of a messaging service that a recipient or sender can open at their discretion.

In another embodiment, context data is directly integrated into the context message. For example, context engine 110 can integrate a media element into the message. In a more specific and related example, context engine 110 can integrate a video clip of the sender's surroundings and a map overview showing a live feed of the geolocations of shared social media contacts within a predetermined proximity of the sender.

It is further contemplated that context data can include context about purely virtual environments. For example, context data can be a sender's current virtual environment in a video game that allows a recipient to see a live stream of a game through the sender's perspective.

Context engine 110 links the context data to the electronic message to create context message (step 208).

In some embodiments, context data is attached as a separate executable file in a context message. For example, context data can be an attachment in a dialogue box of a messaging service that a recipient or sender can open at their discretion.

In another embodiment, context engine 110 directly integrates context data into the context message. For example, context engine 110 can integrate a media element into the message. In a more specific and related example, context engine 110 can integrate a video clip of the sender's surroundings and a map overview showing a live feed of the geolocations of shared social media contacts within a predetermined proximity of the sender.

Figure 3:
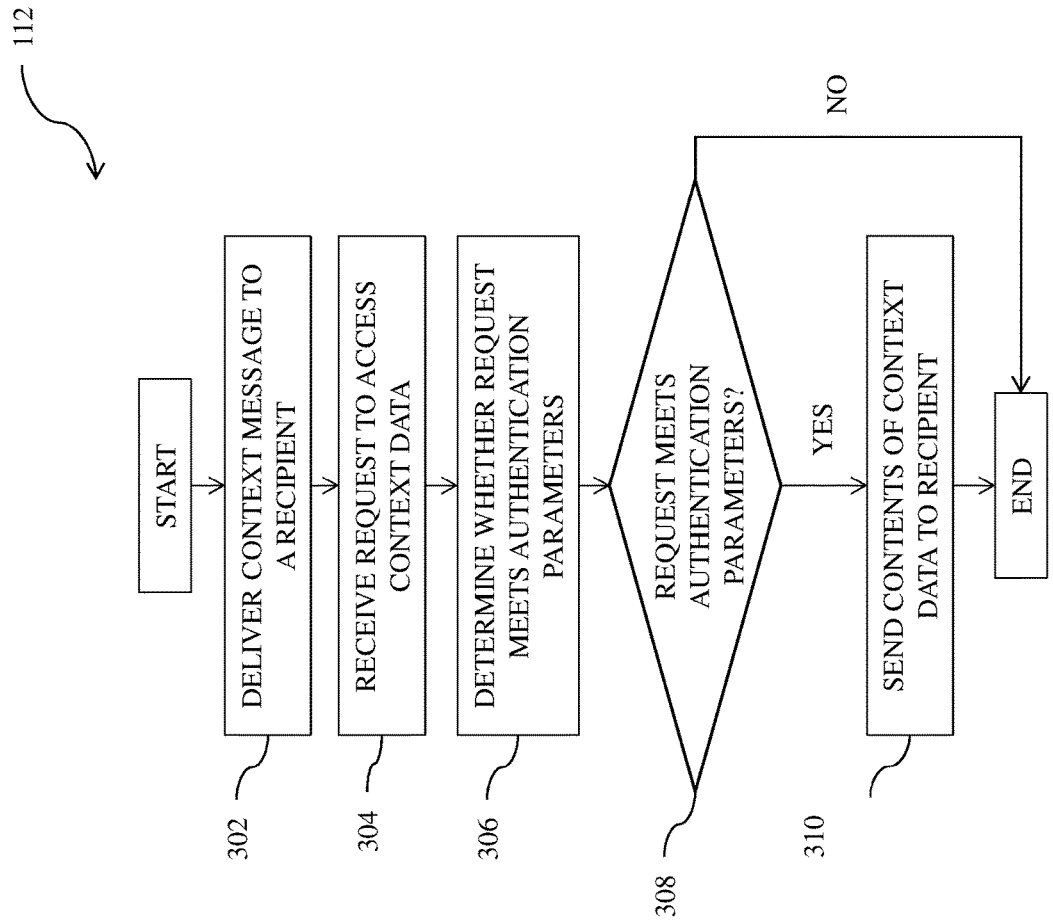
FIG. 3 is a schematic of a method of delivering a context message to a recipient and sending local environmental context based on a recipient request.

FIG. 3 is a schematic of a method of delivering a context message to a recipient and sending local environmental context based on a recipient request.

Context engine 110 delivers the context message to a recipient (step 302).

Context engine 110 can use any means known in the art to deliver the context message to a recipient. In preferred embodiments, context engine 110 delivers the context message to the recipient over network 102. In other embodiments, context engine 110 delivers the context message through purely hardware-based communication channels.

Context engine 110 receives a request to access the context data from a requesting party (step 304).

It is contemplated that requests to access the context data can be in any form available in the art.

In some embodiments, context engine 110 receives a request to access the context data by an affirmative action from the recipient. For example, context engine 110 can receive a request from a context message recipient when the recipient opens an attachment in the context message.

In another embodiment, context engine 110 receives a request to access the context data automatically when a recipient opens the context message. For example, context engine 110 can send a context message containing text with a smaller screen automatically showing a live view of a baseball game from the stadiums official feeds. In this example, it is further contemplated that the live view of the baseball game can show augmented reality elements that identify particular players on the field and real-time tracking of ball-flight by highlighting the ball in red and showing a predicted flight path.

In another example, context engine 110 can send a context message only containing stored program instructions that cause the context message to be a live view from the camera of the sender upon opening.

In some examples, the stored program instruction can cause user interface 106 to show an augmented reality view of the sender's surrounding with interactive elements included. The interactive elements can include, but are not limited to, clickable icons, interactive avatars, and contextual information associated with the message, and messaging overlays.

In a more specific example, the stored program instructions can allow a recipient to view a 360° view of the sender's environment. Upon identifying avatars associated with a friend, the recipient can click the avatar of the friend to view the same environment through the friend's perspective. Additionally, the recipient can input a message through user interface 106 and send the message to the friend.

In some examples, the recipient can send the friend a context message that allows the friend to access a 360° view of the recipient's bedroom. In yet other examples, the recipient can input a message through user interface 106 and simultaneously send the same message to all of the avatars present in the sender's physical environment.

In alternative embodiments, the stored program instructions cause user interface 106 to show a virtual view of a virtual environment associated with the sender. For example, the virtual environment can be an area surrounding a sender's video game character in a game world. It is contemplated that the virtual view of the virtual environment can include interactive elements that allow added functionality, such as the functions associated with interactive elements described above.

Context engine 110 determines whether the request meets an authentication parameter (step 306)

Authentication parameters can include any rules or lack of rules associated with a requesting recipient in opening a context message.

For example, authentication parameters can include rules associated with approved recipients, context data available to particular recipients, geolocation-based restrictions, formatting restrictions, and context data sharing restrictions. In some embodiments context engine 110 requires a recipient to input a password before granting access to the context data.

In response to determining that the request meets the authentication parameter ("YES" branch, decision block 308), context engine 110 sends contents of context data to the recipient (step 310).

In response to determining that the request does not meet the authentication parameter ("NO" branch, decision block 308), context engine 110 ends.

Figure 4:
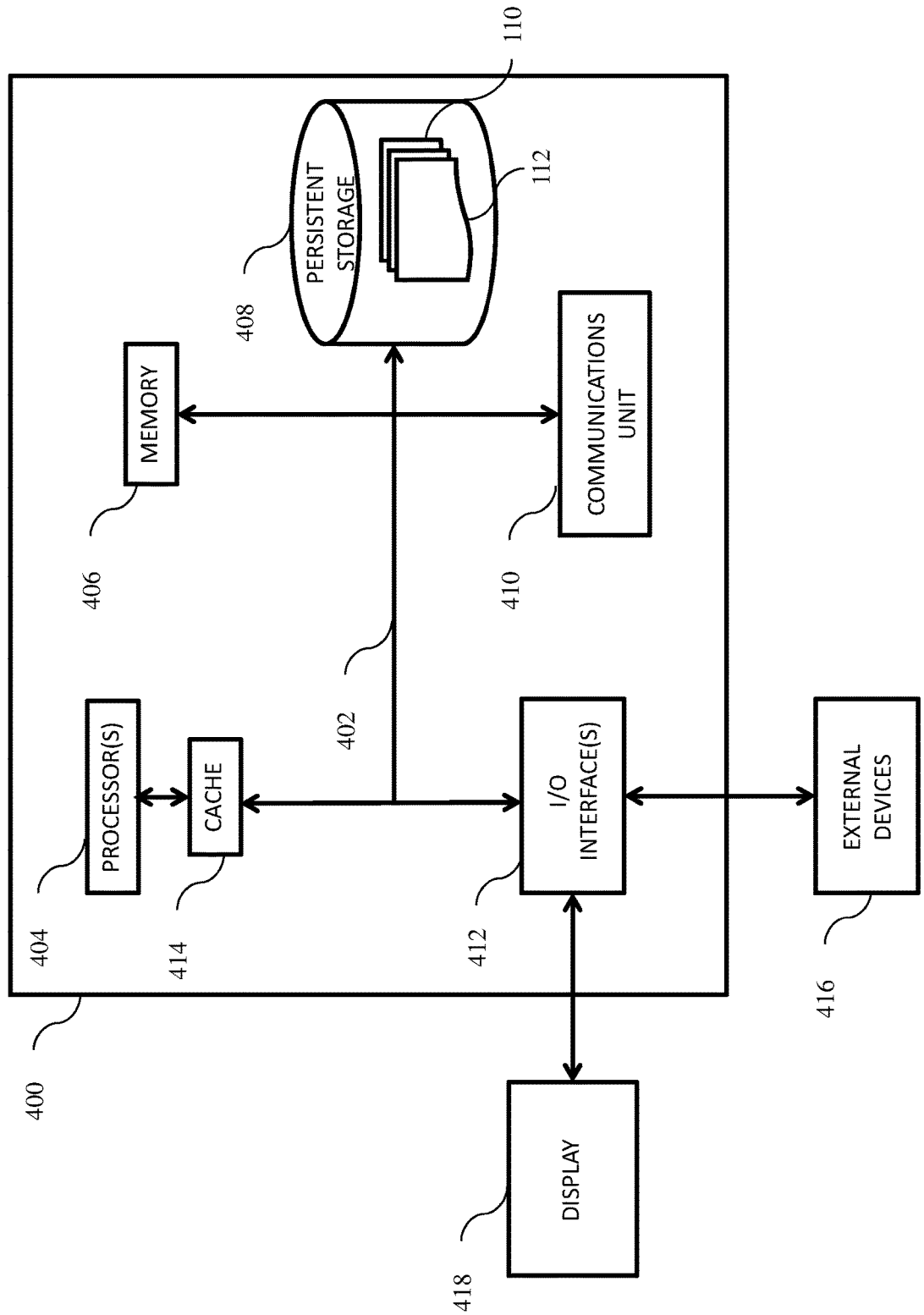
FIG. 4 depicts a block diagram of component of the server computer executing a context engine within the distributed data processing environment of FIG. 1.

FIG. 4 depicts a block diagram of components of the server computer executing context engine 110 within the distributed data processing environment of FIG. 1. FIG. 5 is not limited to the depicted embodiment. Any modification known in the art can be made to the depicted embodiment.

In one embodiment, the computer includes processor(s) 404, cache 414, memory 406, persistent storage 408, communications unit 410, input/output (I/O) interface(s) 412, and communications fabric 402.

Communications fabric 402 provides a communication medium between cache 414, memory 406, persistent storage 408, communications unit 410, and I/O interface 412. Communications fabric 402 can include any means of moving data and/or control information between computer processors, system memory, peripheral devices, and any other hardware components.

Memory 406 and persistent storage 408 are computer readable storage media. As depicted, memory 406 can include any volatile or non-volatile computer storage media. For example, volatile memory can include dynamic random access memory and/or static random access memory. In another example, non-volatile memory can include hard disk drives, solid state drives, semiconductor storage devices, a read-only memory (ROM), an erasable programmable read-only memory (EPROM), a flash memory, and any other storage medium that does not require a constant source of power to retain data.

In one embodiment, memory 406 and persistent storage 408 are random access memory and a hard drive hardwired to computing device 104, respectively. For example, computing device 104 can be a computer executing the program instructions of context engine 110 communicatively coupled to a solid state drive and DRAM.

In some embodiments, persistent storage 408 is removable. For example, persistent storage 408 can be a thumb drive or a card with embedded integrated circuits.

Communications unit 410 provides a medium for communicating with other data processing systems or devices, including data resources used by computing device 104. For example, communications unit 410 can comprise multiple network interface cards. In another example, communications unit 410 can comprise physical and/or wireless communication links.

It is contemplated that context engine 110, database 112, and any other programs can be downloaded to persistent storage 408 using communications unit 410.

In a preferred embodiment, communications unit 410 comprises a global positioning satellite (GPS) device, a cellular data network communications device, and short to intermediate distance communications device (e.g., Bluetooth®, near-field communications, etc.). It is contemplated that communications unit 410 allows computing device 104 to communicate with other computing devices 104 associated with other users.

Display 418 is contemplated to provide a mechanism to display information from context engine 110 through computing device 104. In preferred embodiments, display 418 can have additional functionalities. For example, display 418 can be a pressure-based touch screen or a capacitive touch screen.

In yet other embodiments, display 418 can be any combination of sensory output devices, such as, for example, a speaker that communicates information to a user and/or a vibration/haptic feedback mechanism. For example, display 418 can be a combination of a touchscreen in the dashboard of a car, a voice command-based communication system, and a vibrating bracelet worn by a user to communicate information through a series of vibrations.

It is contemplated that display 418 does not need to be physically hardwired components and can, instead, be a collection of different devices that cooperatively communicate information to a user.

Figures 5A, 5B:
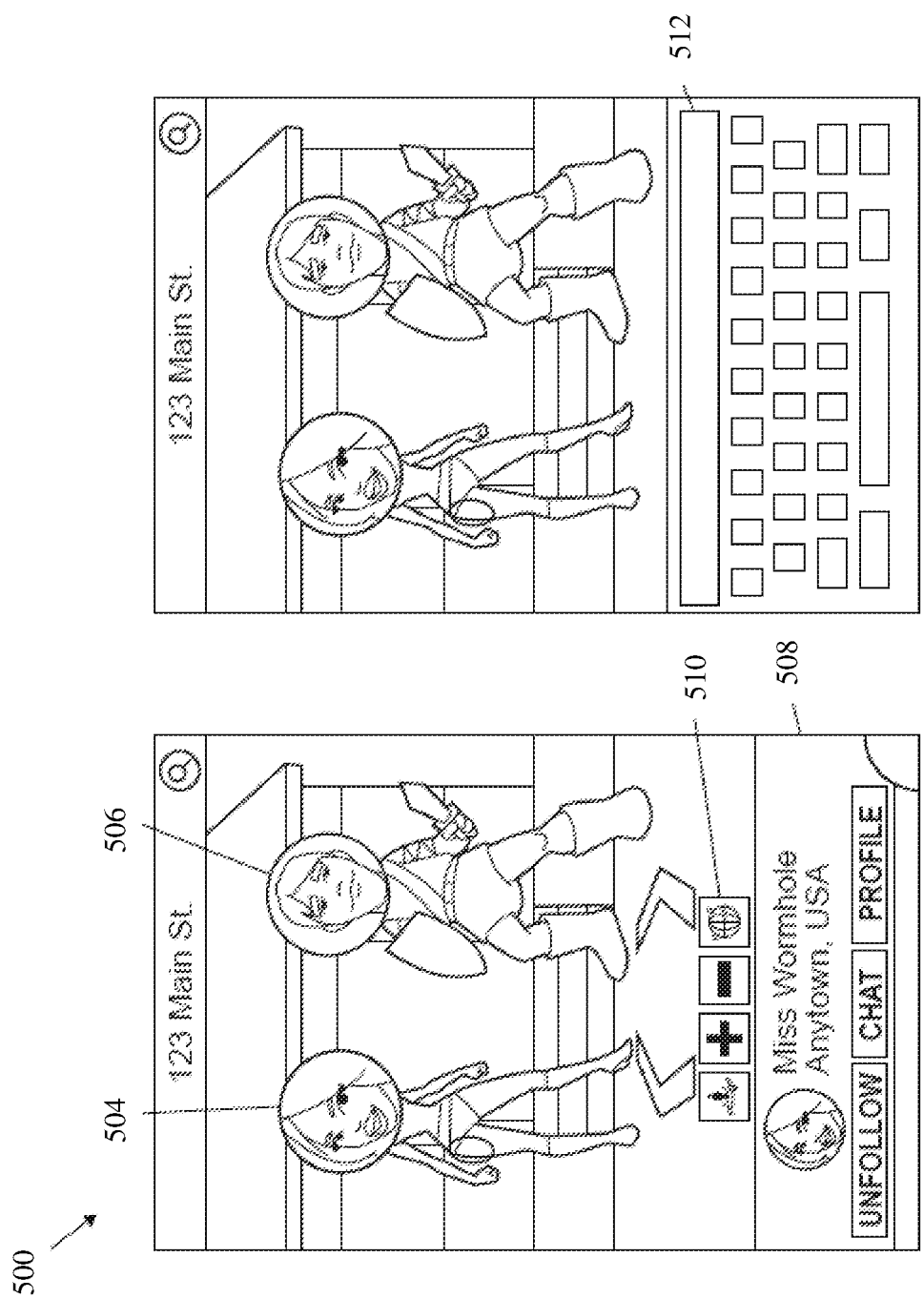
FIG. 5A depicts one embodiment of an augmented reality view interface linked to a context message as context data.
FIG. 5B depicts one embodiment of functionality associated with an interactive object in the augmented reality environment.

FIG. 5A depicts one exemplary augmented reality view interface linked to a context message as context data. Context message interface 500 comprises first avatar 502, second avatar 504, social media icons 508, and navigation icons 510.

First avatar 502 and second avatar 504 can be represented in any manner known in the art. For example, first avatar 502 and second avatar 504 can be partially picture-based, completely virtual, or completely picture-based.

Navigational icons 510 can be any one or more two dimensional and/or three dimensional interactive objects allowing a recipient to navigate an augmented reality and/or virtual reality environment.

Social media icons 508 can be any one or more interactive objects that allows the recipient to connect to an entity in the augmented reality environment. Entities can include, but are not limited, people, objects, and places. For example, a recipient can connect to a business, a particular individual, and a iconic piece of street art through context message interface 500.

FIG. 5B depicts one embodiment of functionality associated with an interactive object in the augmented reality environment. FIG. 5B includes a messaging interface 512 that allows the recipient to send a text message to one or more entities in the augmented reality environment. However, messaging interface 512 can include any messaging functionality available in the art. For example, the recipient can record an audio message or send a picture message.

It should be apparent to those skilled in the art that many more modifications besides those already described are possible without departing from the inventive concepts herein. The inventive target matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of providing a participant with traversable access to mixed reality representation (MRR) of a real-world local environmental context of a first target, different from the participant, comprising:
accessing multiple views of the MRR;
stitching together the multiple views of the MRR, wherein the MRR includes a portal to a first person view of a second MRR from a perspective of a second target;
further to the participant accessing a communication from a the second target, enabling the participant to use the portal during a viewing session to traverse the second MRR, wherein the viewing session at least initially includes the first person view of the second MRR, and wherein the MRR includes at least one interactive element linked to the second MRR of the second target;

providing an interface to the participant, wherein the interface is configured to present targeted context regarding the at least one interactive element associated with the second MRR; and updating the MRR of the first target during the session while the first target is physically located within the real-world local environmental context, wherein the updating the MRR of the first target includes a current geolocation of the first target, such that the updating occurs autonomously for the participant while the participant is accessing the MMR related to the first target.

2. The method of claim 1, wherein the sender is not the first target.

3. The method of claim 1, wherein the local environmental context falls within a threshold physical distance of a current physical space about the first target.

4. The method of claim 3, wherein the local environmental context can include virtual objects.

5. The method of claim 1, wherein the multiple views are sourced from at least one of a static image and a video.

6. The method of claim 1, wherein the participant can add to virtual objects and functionality to the MRR of the first target.

7. The method of claim 1, wherein the participant can be a player in a game.

8. The method of claim 1, wherein the participant can be one party in a digitally transmitted conversation.

9. The method of claim 1, wherein the participant is at least one of a human, a non-human, and a combination of human and non-human elements.

10. The method of claim 1, wherein the portal can be associated with a non-digital medium.

11. The method of claim 10, wherein the non-digital medium is a printed medium.

12. The method of claim 1, wherein the target is at least one of a human, a non-human, and a combination of human and non-human elements.

13. The method of claim 1, wherein the participant can add to virtual objects and functionality to the MRR of the second target.

* * * * *